(12) United States Patent
Lee (10) Patent No.: US 7,155,474 B2
(45) Date of Patent: Dec. 26, 2006

(54) CURRENT-MODE MULTI-VALUED FULL ADDER IN SEMICONDUCTOR DEVICE

(75) Inventor: Yong-Sup Lee, Ichon-shi (KR)

(73) Assignee: Hynix Semiconductor Inc., Ichon-shi (KR)

( * ) Notice: Subject to any disclaimer, the term of this patent is extended or adjusted under 35 U.S.C. 154(b) by 667 days.

(21) Appl. No.: 10/331,977

(22) Filed: Dec. 31, 2002

(65) Prior Publication Data

US 2003/0212730 A1 Nov. 13, 2003

(30) Foreign Application Priority Data

May 10, 2002 (KR) ................................ 2002-25757

(51) Int. Cl.
*G06F 7/50* (2006.01)
(52) U.S. Cl. ...................... 708/702; 708/493
(58) Field of Classification Search ............... 708/700, 708/702, 493
See application file for complete search history.

(56) References Cited

U.S. PATENT DOCUMENTS 4,215,418 A * 7/1980 Muramatsu ................. 708/625
4,982,356 A * 1/1991 Ando ......................... 708/675

5,175,703 A * 12/1992 Ong ............................ 708/701

FOREIGN PATENT DOCUMENTS

| KR | 1999-022762 A | 3/1999 |
|---|---|---|
| KR | 1999-0074561 A | 10/1999 |
| WO | WO 96/42049 A1 | 12/1996 |

OTHER PUBLICATIONS

Current, "Current-Mode CMOS Multiple-Valued Logic Circuits", IEEE Journal of Solid-State Circuits, Vo. 29, No. 2, Feb. 1994, pp. 95-107.*
"Design of Full-Adder Using Current-Mode Multiple-Valued Logic MOS Circuis" (Journal of The Institute of Electronics Engineers of Korea, vol. 39-SD, No. 1, Jan. 2002).
Korean Dec. 12, 2003 office action in connection with Koren application No. 2002-25757.

* cited by examiner

*Primary Examiner*—Tan V. Mai
(74) *Attorney, Agent, or Firm*—Birch, Stewart, Kolasch, and Birch, LLP (57) ABSTRACT

A full adder in a semiconductor device, includes a reference current generation unit for generating a reference current, a carry generation unit for generating a threshold current for generating a carry in response to the reference current and for generating the carry by comparing the input current and the threshold current in response to an input current and a sum signal generation unit for outputting a differential sum signal for the input current and the threshold current according to a comparison result of the carry generation unit.

11 Claims, 7 Drawing Sheets

TWO-VALUED LOGIC    FOUR-VALUED LOGIC

CURRENT-MODE MULTI-VALUED FULL ADDER IN SEMICONDUCTOR DEVICE

FIELD OF THE INVENTION

The present invention relates to a semiconductor device; and, more particularly, to a current-mode multi-valued full adder for adding an input signal in the semiconductor device.

DESCRIPTION OF RELATED ART

An adder is one of sub systems universally used in an integrated circuit system. A basic adder includes a half adder, which is a combination circuit for performing 2-bit summation, a full adder for performing 3-input bit summation.

The full adder receives two inputs A and B and a carry in signal C_in and outputs a sum by performing a summation of the inputs A and B and the carry in signal C-in and a carry out C_out.

<First Prior Art>

Figure 1:
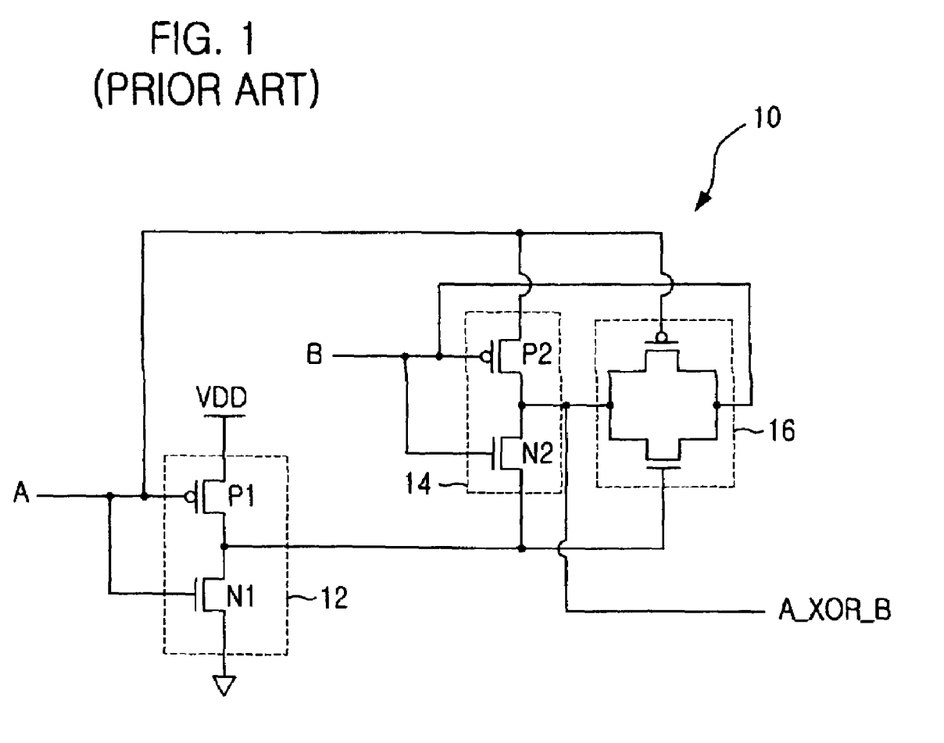
FIG. 1 is a detailed circuit diagram illustrating a conventional XOR gate having a transmission gate for performing exclusive logic summation for 1 bit.

FIG. 1 is a detailed circuit diagram illustrating a conventional XOR gate having a transmission gate for performing exclusive logic summation for 1-bit signal. The XOR gate 10 includes a first inverter 12 inverting an input data A, a second inverter 14 inverting an input data B and a transmission gate 16 transmitting the input data B to an output node in response to an output of the first inverter 12 and the input data A.

The first inverter 12 includes a PMOS transistor P1 and an NMOS transistor N1 coupled in series between a power supply voltage VDD and a ground voltage and the second inverter 14 includes a PMOS transistor P2 and an NMOS transistor N2 coupled in series between an output terminal of the first inverter 12 and the input data A.

The XOR gate 10 outputs an output signal A_XOR_B performing exclusive logical summation for the input data A and B.

Figure 2:
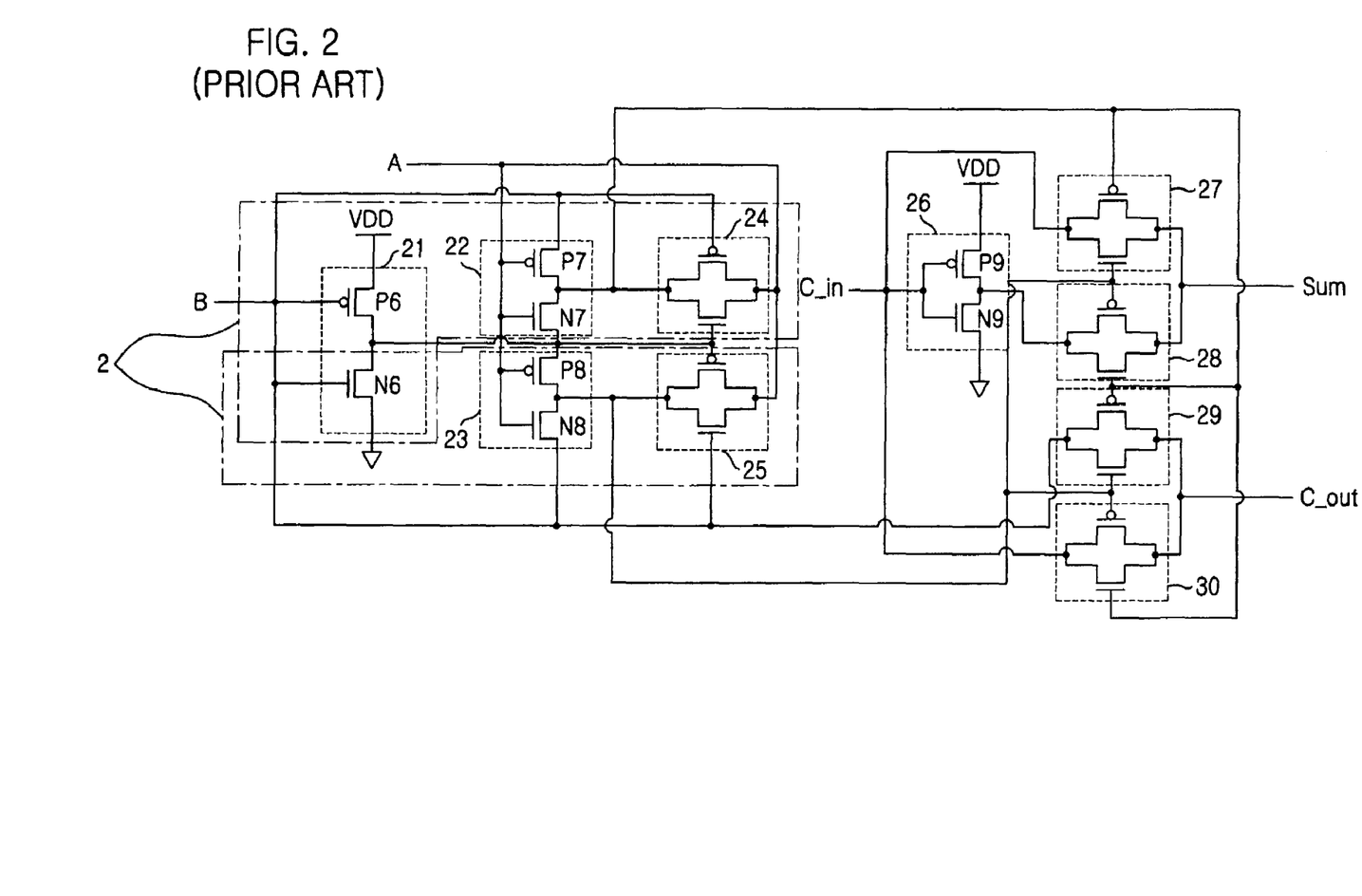
FIG. 2 is a detailed circuit diagram illustrating a conventional adder having a transmission gate, using a XOR gate.

FIG. 2 is a detailed circuit diagram illustrating a conventional adder having a transmission gate, using a XOR gate.

Referring to FIG. 2, the adder having the transmission gate includes two XOR gates 2, an inverter 26 and transmission gates 27 to 30.

The XOR gate 2 is similar to the XOR gate illustrated in FIG. 1. The XOR gate 2 includes an inverter 21 consisting of a PMOS transistor P6 and an NMOS transistor N6 coupled in series between a power supply voltage and a ground voltage, an inverter 22 for outputting an input data B or an output of the inverter 21 in response to an input data A and transmission gates 24 and 25 for transmitting the input data A in response to output signals of an inverter 23 and the inverter 21 and the input data B.

The inverter 22 includes a PMOS transistor P7 and an NMOS transistor N7 for transmitting the input data or the output of the inverter 21 to an input terminal of the transmission gate 24 in response to the input data A. Also, the inverter 23 includes a PMOS transistor P8 and an NMOS transistor N8 for transmitting the input data B or the output of the inverter 21 to an input terminal of the transmission gate 25 in response to the input data A.

An inverter 26 includes a PMOS transistor P9 and an NMOS transistor N9 for applying a power supply voltage or a ground voltage to an input terminal of the transmission gate 28 in response to a carry_in signal C_in transmitted from a previous stage.

A transmission gate 27 in the adder of the transmission gate type plays a role of transmitting the carry_in signal C_in to a data sum terminal Sum in response to outputs of the inverters 22 and 23. The transmission gate 28 transmits the output of the inverter 23 to the data sum terminal Sum in response to outputs of the inverters 22 and 23.

Another transmission gates 29 and 30 transmits an output of the inverter 26 to the carry out C_out terminal in response to each output of the inverters 22 and 23, respectively.

Figure 3:
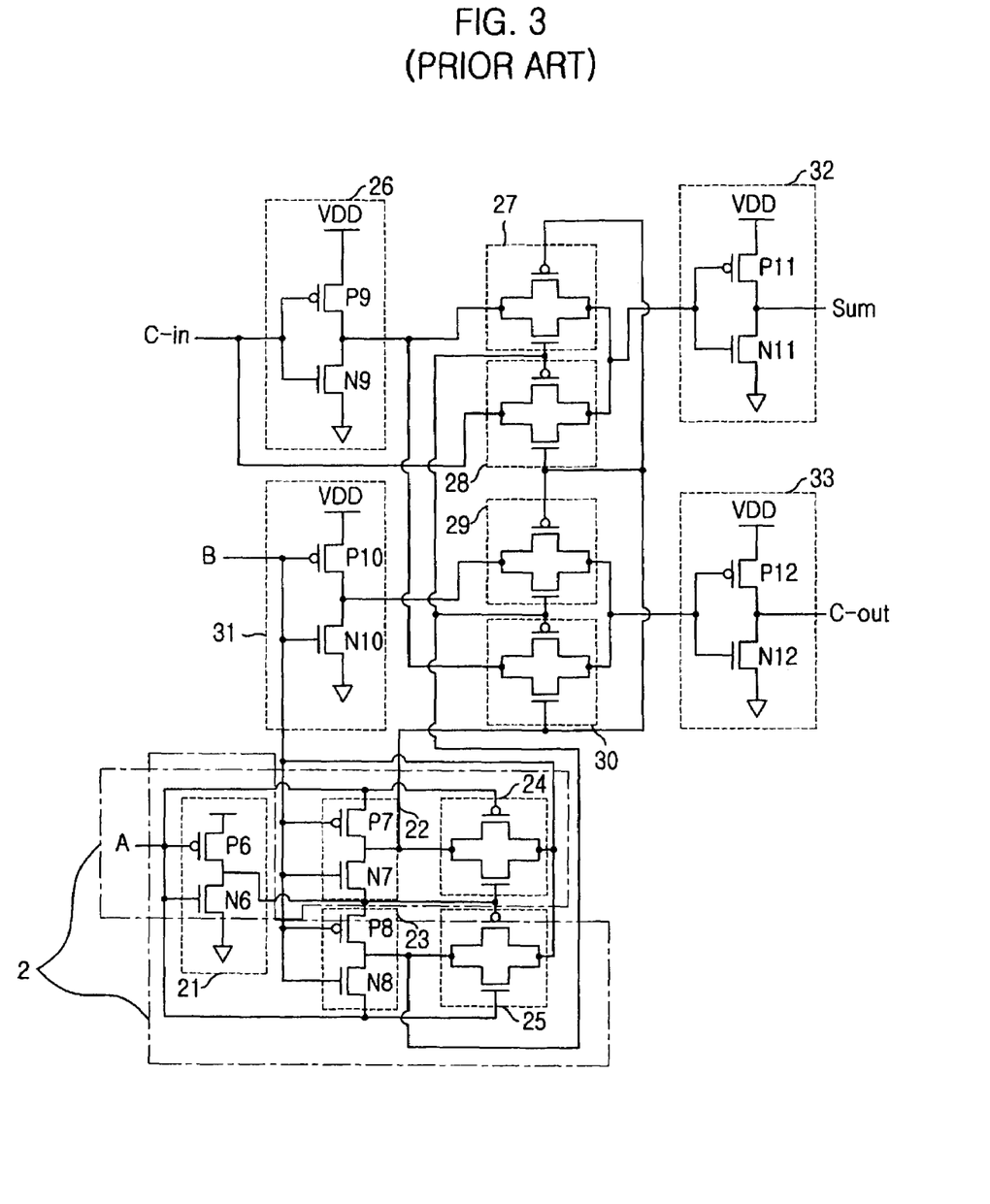
FIG. 3 is a circuit diagram illustrating a conventional full adder having an output driving unit.

FIG. 3 is a circuit diagram illustrating a full adder, which similar to the full adder shown in FIG. 2, having an output driving unit.

The full adder in FIG. 3 additionally includes an inverter 31 consisting of a PMOS transistor P10 and an NMOS transistor N10, an inverter 32 consisting of a PMOS transistor P12 and an NMOS transistor N12 and an inverter 33 consisting of a PMOS transistor P12 and an NMOS transistor N12 compared with the full adder shown in FIG. 2. Since a substantial operation of the full adder in FIG. 3 is similar to that of the full adder in FIG. 2, an explanation of operation thereof will be not described.

Recently, as a high performance and high integration of a semiconductor chip is implemented due to an improved integration technology of the semiconductor chip, the number of operational gates, transistors and internal signal lines is rapidly increased. Therefore, there are problems that the number of gates is too many and it is difficult to connect gates each other. Also, a lot of data processing is required. In order solve the above problems, a multi valued logic circuit is introduced.

The full adder described according to the first prior art is a voltage-mode full adder. The conventional full adder includes two input terminals A and B and two output terminals C-out and Sum. 1-bit operation for one operation is carried out. Therefore, an operation speed is decreased. Since an operation voltage is decreased more and more, e.g., blow 3.3V, it cannot be expected that an accurate operation is carried out.

In order to solve the above of the voltage-mode full adder, a current-mode full adder is introduced.

<Second Prior Art>

Figure 4:
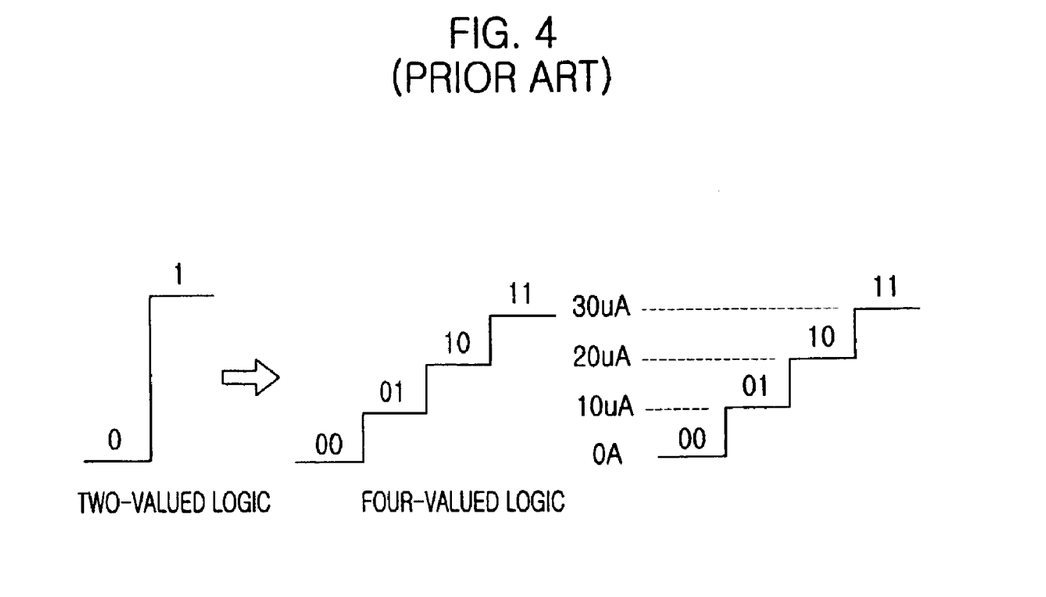
FIG. 4 is a graph illustrating a two-valued logic and a four-valued logic of the voltage-mode of the full adder according to the second prior art.

FIG. 4 is a graph illustrating a two-valued logic and a four-valued logic of the current-mode of the full adder according to the second prior art.

Referring to FIG. 4, the voltage-mode two-valued logic represents only binary logic values, i.e., '0' and '1' corresponding 0 V and 5 V, respectively. On the other hand, the current-mode four-valued logic represents quaternary logic values, i.e., '00', '01', '10' and '11'. Each current level represents 2-bit logic value. The quaternary logic values, '00', '01', '10' and '11', corresponds to current levels, 0 µA, 10 µA, 20 µA and 30 µA and a 2-bit adding operation can be performed for one operation.

Figure 5:
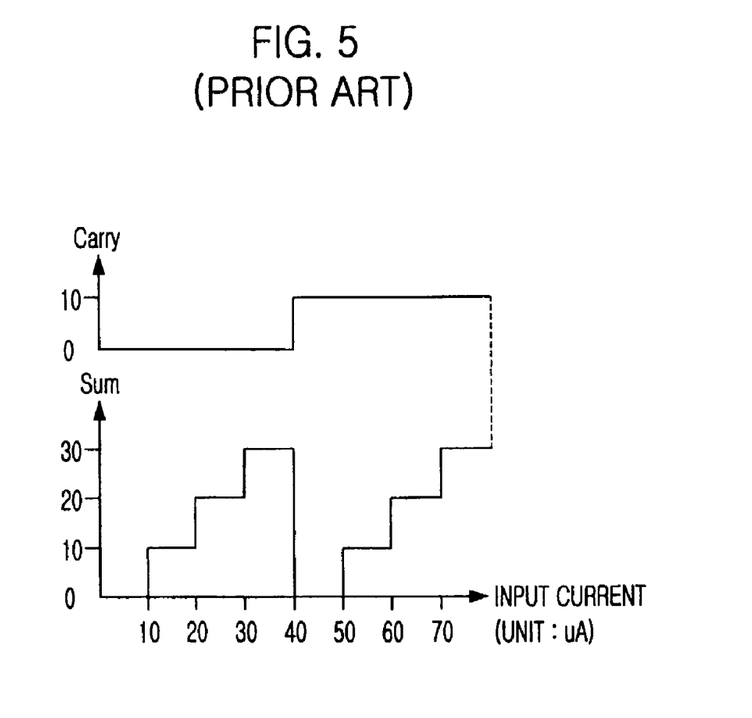
FIG. 5 is a timing diagram illustrating an operation of the current-mode four-valued logic full adder.

FIG. 5 is a timing diagram illustrating an operation of the current-mode four-valued logic full adder. A horizontal axis represents an input current (µA) and a vertical axis represents sum Sum and a carry Carry.

Referring to FIG. 5, an input current range is from 0 µA to 70 µA. When the input current becomes 40 µA, the carry is generated and the sum becomes 0 µA. Since the maximum current value of the input signal is 30 µA, if two input current values become the maximum 60 µA and the carry of 10 µA is generated, the maximum input current value becomes 70 µA.

Figure 6:
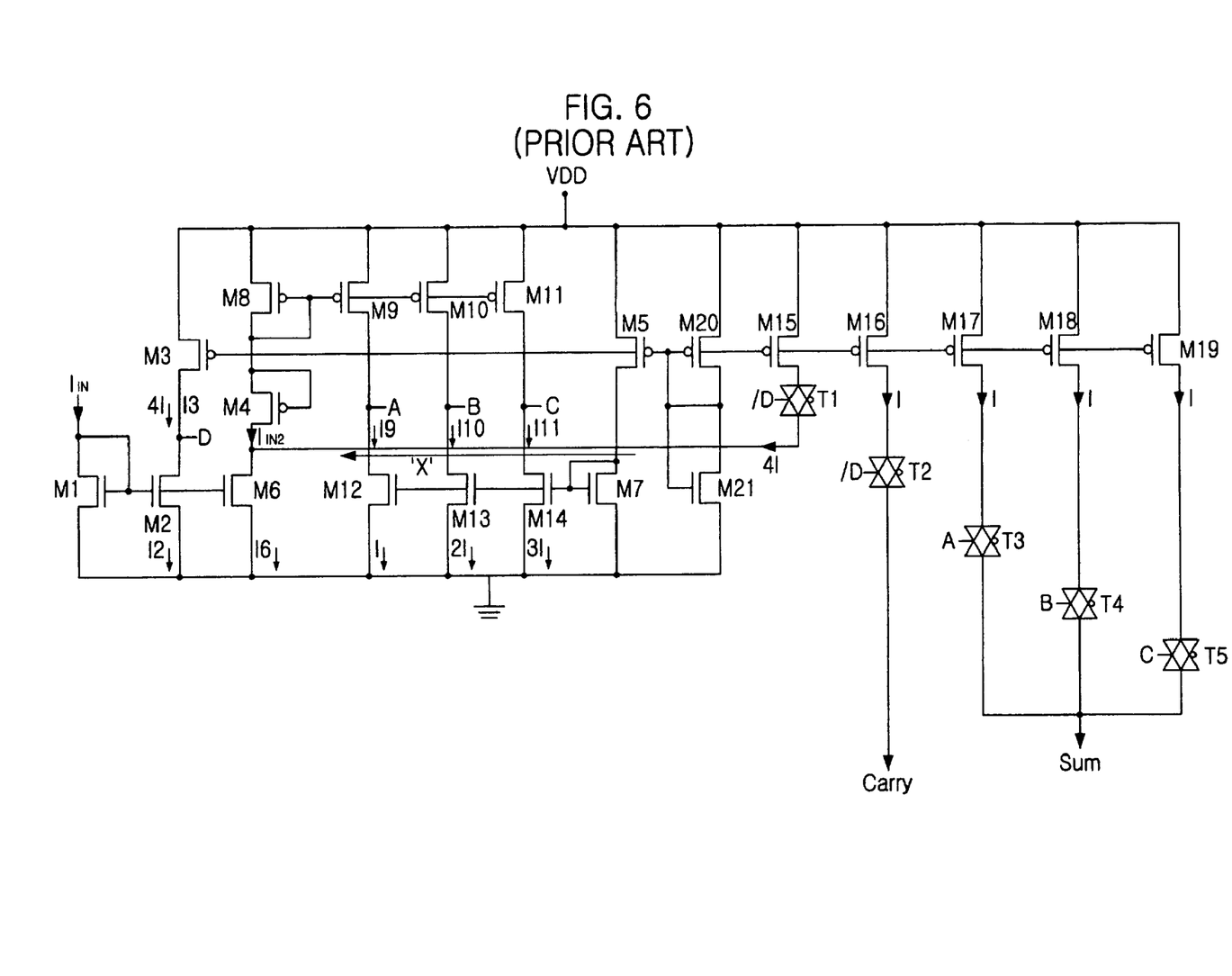
FIG. 6 is a detailed circuit diagram illustrating the full adder according to the second prior art.

FIG. 6 is a detailed circuit diagram illustrating the full adder according to the second prior art.

Referring to FIG. 6, the full adder includes one input terminal $I_{IN}$ and two output terminals Carry and Sum. And the full adder further includes 26 transistors and a 2-bit operation is implemented for one operation.

The input current $I_{IN}$ is inputted to a diode-coupled NMOS transistor M1 and mirrored by NMOS transistors M2 and M6. A PMOS transistor M20 and an NMOS transistor M21, which are diode-coupled and coupled in series between a power supply voltage and a ground voltage, generates a reference voltage to thereby always turn on PMOS transistors, M3, M5, M15, M16, M17, M18 and M19, whose gates are commonly coupled. The transistors M16, M17, M18 and M19 are designed with the same size in order that a reference current I identically flows. A current flowing the transistors M3 and M15 is N times of the reference current I, where N is integer. In the four-valued logic operation, the current flowing the transistors M3 and M15 corresponds to threshold current 4I.

An NMOS transistor M7 is diode-coupled between a drain of the NMOS transistor M5 and a ground voltage to thereby always turn on NMOS transistors M12, M13 and M14, whose gates are commonly coupled. Therefore, constant currents flow at the NMOS transistors M12, M13 and M14, respectively. In the four-valued logic operation, currents flowing at the NMOS transistors M12, M13 and M14 are I, 2I and 3I, respectively.

PMOS transistors M9, M10 and M11, whose gates are commonly coupled to a gate of a diode-coupled PMOS transistor M8, are coupled to the transistors M12, M13 and M14 and, when the input current $I_{IN}$ is inputted, a logic 'high' or 'low' signal is outputted through terminals thereof.

A PMOS transistor is inversely diode-coupled to prevent that a current inversely flows when current 4I flows by turning on a transmission gate T1. An output D of the PMOS transistor M3 outputs a carry, which can determine whether the transmission gate T1 is turned on or off. The outputs A, B and C of the transistors M9, M10 and M11 determine on/off of transmission gates T3, T4 and T5 and the transmission gates T3, T4 and T5 output sum Sum.

Hereinafter, an operation of the current-mode four-valued will be described and the reference current is assumed as 10 μA.

When the input current $I_{IN}$ is 10 μA, the transistor M2 is turned on and a current I2 of the transistor M2 becomes 10 μA by current mirroring with the transistor M1. When the transistor M3 is a stand-by mode, the transistor M2 is turned on, a current path from the transistor M3 to a ground voltage via the transistor M2 is formed. At this time, the transistor M3 is designed to make current 4I, i.e., 40 μA flow. Since the current I2 is 10 μA, a current flowing through D is 30 μA corresponding to a logic 'high' signal. Since the logic 'high' signal is inputted to /D, the transmission gates T1 and T2 are turned off, so that a current path of 'X' is not formed. Therefore, a current I6 and a current $I_{IN2}$ become 10 μA and currents I9, I10 and I11 becomes 10 μA by current mirroring.

Since the transistor M12 is designed to make current I, i.e., 10 μA flow, the node A becomes a logic 'high', so that the transmission gate T3 is turned on to thereby outputs logic value '01'. Herein, since the transistors M13 and M14 are designed to make currents 20 μA and 30 μA flow, the nodes B and C become a logic 'low', so that the transmission gates T4 and T5 are turned off.

When the input current is 20 μA, the transistor M2 is turned on and the current I2 becomes 20 μA by current mirroring with the transistor M1. When the transistor M3 is a stand-by mode, the transistor M2 is turned on, a current path from the transistor M3 to a ground voltage via the transistor M2 is formed. At this time, the transistor M3 is designed to make current 4I, i.e., 40 μA flow. Since the current I2 is 20 μA, a current flowing through D is 20 μA corresponding to a logic 'high' signal. Since the logic 'high' signal is inputted to /D, the transmission gates T1 and T2 are turned off, so that the carry is not generated and, since the transmission gate T1 is turned off, a current path of 'X' is not formed. Therefore, a current I6 and a current $I_{IN2}$ become 20 μA and currents I9, I10 and I11 becomes 20 μA by current mirroring.

Since the transistor M12 is designed to make current I i.e., 10 μA flow and the transistor M13 is designed to make current 20 μA flow, the nodes A and B become a logic 'high', so that the transmission gate T3 and T4 are turned on to thereby outputs sum of logic value '10'. Herein, since the transistors M14 is designed to make current 30 μA flow, the node C becomes a logic 'low', so that the transmission gate T5 is turned off.

When the input current is 30 μA, the transistor M2 is turned on and the current I2 becomes 30 μA by current mirroring with the transistor M1. When the transistor M3 is a stand-by mode, the transistor M2 is turned on, a current path from the transistor M3 to a ground voltage via the transistor M2 is formed. At this time, the transistor M3 is designed to make current 4I, i.e., 40 μA flow. Since the current I2 is 30 μA, a current flowing through D is 10 μA corresponding to a logic 'high' signal. Since the logic 'high' signal is inputted to /D, the transmission gates T1 and T2 are turned off, so that the carry is not generated and, since the transmission gate T1 is turned off, a current path of 'X' is not formed. Therefore, a current I6 and a current $I_{IN2}$ become 30 μA and currents I9, I10 and I11 becomes 30 μA by current mirroring.

Since the nodes A, B and C become a logic 'high', the transmission gates T3, T4 and T5 are turned off, so that the sum of '11' is outputted.

When the input current is 40 μA, the transistor M2 is turned on and the, current I2 becomes 400 μA by current mirroring with the transistor M1. When the transistor M3 is a stand-by mode, the transistor M2 is turned on, a current path from the transistor M3 to a ground voltage via the transistor M2 is formed. At this time, the transistor M3 is designed to make current 4I, i.e., 40 μA flow. Since the current I2 is 40 μA, a current does not flow through D. Since the logic 'low' signal is inputted to /D, the transmission gates T1 and T2 are turned on, so that the carry is generated, that is to say, a current I of 10 μA flows and, since the transmission gate T1 is turned on, a current path of 'X' is formed. Therefore, a current 4I, i.e., 40 μA flows at the 'X' path. Since the current flowing at I6 is 40 μA, a current $I_{IN2}$ does not flow and the inversely flowing current is prevented by the transistor M4. At this time, the currents I9, I10 and I11 becomes also 0 μA. Accordingly, when the input current $I_{IN}$ is 40 μA, the carry is generated, so that the sum is not generated.

Also, when the input current $I_{IN}$ is 50 μA, 60 μA and 70 μA, the carry of 10 μA is generated and sum is generated for each input currents, respectively. A detailed explanation is similar to the above-mentioned operations, so that the explanation will be omitted and a table representing the operation of the current-mode full adder is as follows:

TABLE 1

| $I_{IN}$ (μA) | I3 (μA) | $I_{IN2}$ (μA) | D(logic) | /D(logic) | Sum | Carry |
|---|---|---|---|---|---|---|
| 0 | 0 | 0 | '1' | '0' | '00'0 μA | '0'0 μA |
| 10 | 40 | 10 | '1' | '0' | '01'10 μA | '0'0 μA |
| 20 | 40 | 20 | '1' | '0' | '10'20 μA | '0'0 μA |
| 30 | 40 | 30 | '1' | '0' | '11'30 μA | '0'0 μA |
| 40 | 40 | 0 | '0' | '1' | '00'0 μA | '1'0 μA |
| 50 | 40 | 10 | '0' | '1' | '01'10 μA | '1'0 μA |
| 60 | 40 | 20 | '0' | '1' | '10'20 μA | '1'0 μA |
| 70 | 40 | 30 | '0' | '1' | '11'30 μA | '1'0 μA |

As mentioned above, the current-mode four-valued full adder according to the second prior art includes one input terminal $I_{IN}$, two output terminals Carry and Sum, 21 transistors and 5 transmission gates. The current-mode four-valued full adder has a merit that an operation speed is twice higher than that of the voltage-mode full adder.

However, since 21 transistors and 5 transmission gates are employed in the current-mode full adder, power consumption is increased and it is difficult to increase an integration degree and an operation speed.

SUMMARY OF THE INVENTION

It is, therefore, an object of the present invention to provide a full adder reducing the number of transistors and increasing an integration degree in the semiconductor device.

In accordance with an aspect of the present invention, there is provided to a full adder in a semiconductor device, comprising: a reference current generation means for generating a reference current; a carry generation means for generating a threshold current for generating a carry in response to the reference current and for generating the carry by comparing the input current and the threshold current in response to an input current; and a sum signal generation means for outputting a differential sum signal for the input current and the threshold current according to a comparison result of the carry generation means.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Figure 7:
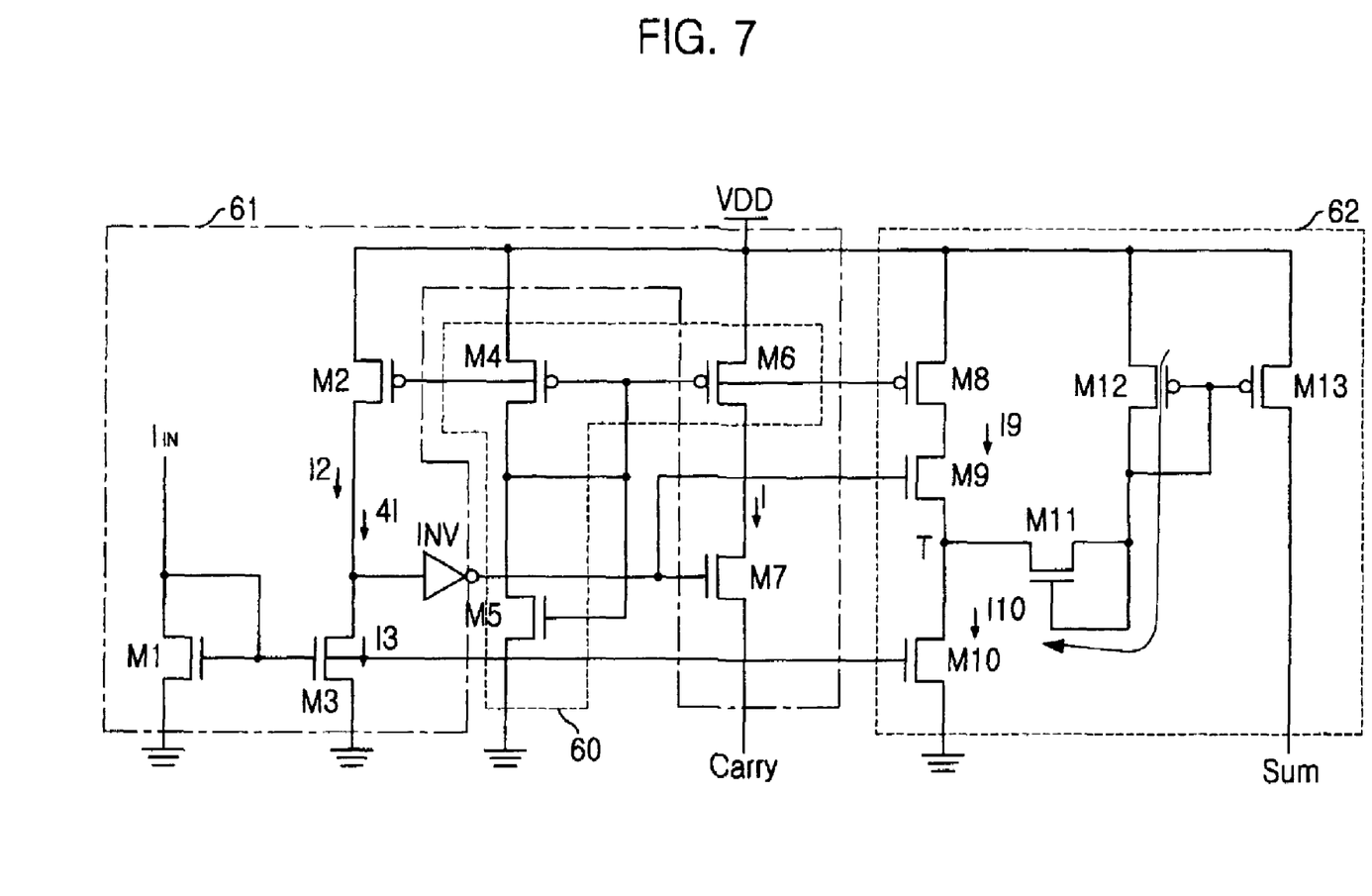
FIG. 7 is a detailed circuit diagram illustrating a full adder in accordance with the preferred embodiment of the present invention.

FIG. 7 is a detailed circuit diagram illustrating a full adder in accordance with the preferred embodiment of the present invention.

Referring to FIG. 7, the full adder includes a reference current generation unit 60, a carry generation unit 61 and a sum signal generation unit 62. The reference current generation unit 60 generates a reference current I and the carry generation unit 61 generates a threshold current (e.g., 4I for a four-valued logic) for generating the carry in response to the reference current I and generates the carry by comparing the input current $I_{IN}$ and the threshold current 4I. The sum signal generation unit 62 outputs the sum signal, which is a differential signal by the threshold current 4I for the input current $I_{IN}$ according to a comparison result in the carry generation unit 61.

The carry generation unit 61 and the sum signal generation unit 62 are operated by mirroring the input current $I_{IN}$ and the threshold current is n times for the input current, wherein n is integer. In the preferred embodiment of the present invention, since the four-valued full adder is used, the threshold current becomes 4I, so that it is four times of the reference current. The threshold current 4I and the reference current I are adjusted by a ratio of width and length of transistors forming a current mirror.

When the input current $I_{IN}$ is lower than the threshold current 4I, the carry generation unit 61 does not generate the carry. When the input current $I_{IN}$ is higher than or equal to the threshold current 4I, the carry is generated. Accordingly, when input current $I_{IN}$ is lower than the threshold current 4I, the sum signal is generated and, when the input current $I_{IN}$ is equal to the threshold current 4I, the carry is only generated. When the input current $I_{IN}$ is higher than the threshold current 4I, the carry and sum signals are generated at the same time.

The reference current generation unit 60 includes a diode-coupled a first conductive (hereinafter, referred as PMOS) transistor M4 and a second conductive (hereinafter, referred as NMOS) transistor M2 coupled in series between the a first voltage (hereinafter, referred as power supply voltage VDD) and a second voltage (hereinafter, referred as ground voltage) and a PMOS transistor M6, whose gate is commonly coupled with a gate of the PMOS transistor M4 and source is coupled to the power supply voltage, for generating the reference current I from its drain.

The reference current generation unit 60 is configured with a kind of a P-channel current mirror type to form a typical current source. The current source supplies an identical current with an applied current to a load regardless of a terminal voltage of the load. Drains and gates of the transistors M4 and M5 are coupled to a common node, so that the transistors M4 and M5 are operated in a saturation region and a constant gate voltage of the transistor M6 is maintained according to a resistance ration of the transistors M4 and M5. As the constant gate voltage of the transistor M6 makes that a current flowing the transistor M6 is uniformly maintained, so that the transistor M6 acts as the current source. The reference current generation unit 60 is employed to generate the reference current I and the threshold current in the current-mode multi-valued logic circuit.

The carry generation unit 61 includes PMOS transistors M6 and M2, NMOS transistors M1, M3 and M7 and an inverter INV. The PMOS transistor M6 outputs the reference current I and the PMOS transistor M2, whose source is coupled to the power supply voltage VDD and gate is commonly coupled gates of the transistors M4 and M6, outputs the threshold current 4I from its drain. The NMOS transistor M1, whose drain and gate are coupled, receives the input signal $I_{IN}$ to its drain. The NMOS transistor M3, whose drain receives the threshold current 4I, forms a current mirror with the transistor M1. The inverter INV coupled to the drain of the NMOS transistor M3 outputs a first logic (hereinafter, referred as logic 'low') signal when the input current $I_{IN}$ is lower than the threshold current 4I and outputs a second logic (hereinafter, referred as logic 'high') signal when the input current $I_{IN}$ is higher than or equal to the threshold current 4I. The NMOS transistor M7, whose drain is commonly coupled with the PMOS transistor M6 and gate receives an output of the inverter INV, outputs the carry when the output of the inverter INV is a logic 'high' signal.

The sum signal generation unit 62 includes PMOS transistors M8, M12 and M13 and NMOS transistors M9, M10 and M11. The PMOS transistor M8 forms a current mirror with the PMOS transistor M6 and the NMOS transistor M9, whose gate receives the output of the inverter INV, is coupled in series with the PMOS transistor M8. The NMOS transistor M10, which forms a current mirror with the NMOS transistor M1, is coupled between the NMOS transistor M9 and the ground voltage. The diode-coupled NMOS transistor M11, which is coupled to a node 'T' between the NMOS transistor M10 and the NMOS transistor M9, supplies a differential current of the threshold current 4I and the input current $I_{IN}$ according to turn-on or turn-off of the NMOS transistor M9. The PMOS transistor M12 is diode-coupled between the power supply voltage and the NMOS transistor M11. The PMOS transistor M13, which forms a current mirror with the PMOS transistor M12, outputs the sum signal, which is a differential current of the input current $I_{IN}$ and the threshold current 4I.

The NMOS transistors M1, M3 and M10, which are designed with the same size, are operated in response to the input signal $I_{IN}$. The PMOS transistor M2 and the PMOS transistor M8 are designed with the same size, which corresponds to 4 times size of the PMOS transistor in order that the threshold current 4I flows. At this time, the NMOS transistors and the PMOS transistors can be inversely used in the present invention. The NMOS transistor M11, which is inversely coupled from the node 'T', prevents that the current inversely flows.

Hereinafter, an operation of the current-mode four-valued full adder will be described in accordance with the present invention. The reference current I is assumed as 10 µA.

When the input current $I_{IN}$ is 0 µA, the outputs sum and carry become '00' and '0', respectively.

When the input current $I_{IN}$ is 10 µA, the transistor M3 is turned on and the current I3 of the transistor M3 becomes 10 µA by a current mirroring with the transistor M1. When the transistor M2 is a stand-by mode, since the transistor M3 is turned on, a current path is formed from the transistor M2 to the ground voltage via the transistor M3. At this time, since the transistor M2 is designed to make 4I, i.e., 40 µA flow, the current I2 becomes 40 µA. At this time, since the current I3 is 10 µA, a current of 30 µA flows through the inverter INV. Since the 30 µA corresponds to a logic 'high', the output of the inverter INV becomes a logic 'low', so that the transistor M7 is turned off. Therefore, the carry is not generated and the transistor M9, whose gate receives the output of the inverter INV, is turned off.

Since the current I9 does not flow and the current I10 flows with 10 µA in the transistor M10 by a current mirror with the input current $I_{IN}$, a current of 10 µA flows along the current path 'l'. The current I13 mirroring the transistor M10 flows with 10 µA, so that the sum signal becomes 10 µA.

When the input current $I_{IN}$ is 20 µA, the transistor M3 is turned on and the current I3 of the transistor M3 becomes 20 µA by a current mirroring with the transistor M1. When the transistor M2 is a stand-by mode, since the transistor M3 is turned on, a current path is formed from the transistor M2 to the ground voltage via the transistor M3. At this time, since the transistor M2 is designed to make 4I, i.e., 40 µA flow, the current I2 becomes 40 µA. At this time, since the current I3 is 20 µA, a current of 20 µA flows through the inverter INV. Since the current of 20 µA corresponds to a logic 'high', the output of the inverter INV becomes a logic 'low', so that the transistors M7 and M9 are turned off. Therefore, the carry is not generated.

Since the current I9 does not flow and the current I10 flows with 20 µA in the transistor M10 by a current mirror with the input current $I_{IN}$, a current of 20 µA flows along the current path 'l'. The current I13 mirroring the transistor M10 flows with 20 µA, so that the sum signal becomes 20 µA.

When the input current $I_{IN}$ is 30 µA, the transistor M3 is turned on and the current I3 of the transistor M3 becomes 30 µA by a current mirroring with the transistor M1. When the transistor M2 is a stand-by mode, since the transistor M3 is turned on, a current path is formed from the transistor M2 to the ground voltage via the transistor M3. At this time, since the transistor M2 is designed to make 4I, i.e., 40 µA flow, the current I2 becomes 40 µA. At this time, since the current I3 is 30 µA, a current of 10 µA flows through the inverter INV. Since the current of 10 µA corresponds to a logic 'high', the output of the inverter INV becomes a logic 'low', so that the transistor M7 is turned off. Therefore, the carry is not generated and the transistor M9, whose gate receives the output of the inverter INV, is turned off.

Since the current I9 does not flow and the current I10 flows with 30 µA in the transistor M10 by a current mirror with the input current $I_{IN}$, a current of 30 µA flows along the current path 'l'. The current I13 mirroring the transistor M10 flows with 30 µA, so that the sum signal becomes 30 µA.

When the input current $I_{IN}$ is 40 µA, the transistor M3 is turned on and the current I3 of the transistor M3 becomes 40 µA by a current mirroring with the transistor M1. When the transistor M2 is a stand-by mode, since the transistor M3 is turned on, a current path is formed from the transistor M2 to the ground voltage via the transistor M3. At this time, since the transistor M2 is designed to make 4I, i.e., 40 µA flow, the current I2 becomes 40 µA. At this time, since the current I3 is 40 µA, a current does not flow through the inverter INV. Since the output of the inverter INV becomes a logic 'low', so that the transistor M7 is turned on. Therefore, the carry is generated and the transistor M9, whose gate receives the output of the inverter INV, is turned on.

Since the transistor M9 is turned on, the current I9 of the transistor M8, which is designed to make the threshold current 4I of 40 µA flow, flows to the ground voltage via the node 'T'. Since the currents of I9 and I10 are 40 µA, respectively, the current flowing through the current path 'l' is nothing. The inversely flowing current is prevented by the transistor M11. Accordingly, when the input current $I_{IN}$ is 40 µA, the carry is generated and the sum signal is not generated.

Also, when the input current $I_{IN}$ is 50 µA, 60 µA and 70 µA, the carry of 10 µA is generated and sum is generated for each input currents, respectively. A detailed explanation is similar to the above-mentioned operations, so that the explanation will be omitted and a table Table 2 representing the operation of the current-mode full adder is as follows:

TABLE 2

| $I_{IN}$ (μA) | I2 (μA) | I10 (μA) | INV | INV | Sum | Carry |
|---|---|---|---|---|---|---|
| 0 | 0 | 0 | '1' | '0' | '00'0 μA | '0'0 μA |
| 10 | 40 | 10 | '1' | '0' | '01'10 μA | '0'0 μA |
| 20 | 40 | 20 | '1' | '0' | '10'20 μA | '0'0 μA |
| 30 | 40 | 30 | '1' | '0' | '11'30 μA | '0'0 μA |
| 40 | 40 | 0 | '0' | '1' | '00'0 μA | '1'0 μA |
| 50 | 40 | 10 | '0' | '1' | '01'10 μA | '1'0 μA |
| 60 | 40 | 20 | '0' | '1' | '10'20 μA | '1'0 μA |
| 70 | 40 | 30 | '0' | '1' | '11'30 μA | '1'0 μA |

As mentioned above, the current-mode four-valued logic full adder includes one input terminal, two output terminals carry and sum, 13 transistors and one inverters in accordance with the preferred embodiment of the present invention.

Also, the transistors M1, M3 and M10 form a current mirror. Since the current mirror has a plurality of outputs I3 and I10 with one input current source, the problem outputting one bit for one operation is solved. The output current is determined by adjusting a ration of width and length of the transistors. A differential circuit is configured by the transistors M11, M12 and M13, so that a differential signal for the current I10 and the current I9 is outputted as the sum signal.

Figure 8:
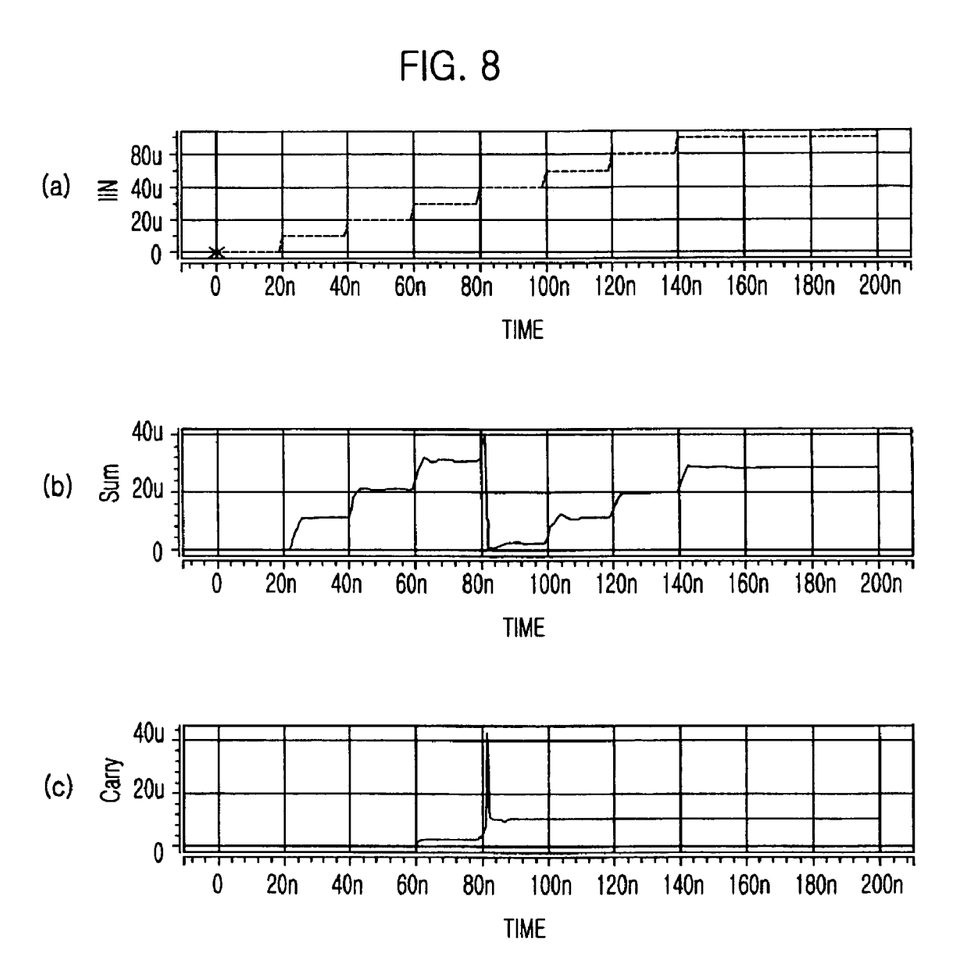
FIG. 8 is graphs illustrating operations of the input current $I_{IN}$, the sum signal and the carry in accordance with the present invention.

FIG. 8 is graphs illustrating operations of the input current $I_{IN}$, the sum signal (sum) and the carry in accordance with the present invention.

As shown, the graph (a) shows the operation of the input current $I_{IN}$, the graph (b) shows the operation of the sum signal and the graph (c) shows the operation of the carry. The reference current can be varied according to kinds of systems.

As mentioned above, the current-mode multi-valued full adder in accordance with the preferred embodiment of the present invention can reduce the number of transistors compared with that of the prior art. Also, since a 2-bit operation can be implemented, an rapid operation speed is expected and a power consumption is reduced.

The current-mode multi-valued full adder can be applied to not only the four-valued logic, but also eight-valued logic, 16-valued logic and the like without increasing the number of transistors.

While the present invention has been described with respect to the particular embodiments, it will be apparent to those skilled in the art that various changes and modifications may be made without departing from the spirit and scope of the invention as defined in the following claims.

What is claimed is:

1. A full adder in a semiconductor device, comprising:
   a reference current generation means for generating a reference current;
   a carry generation means for generating a threshold current in response to the reference current and generating a carry by comparing an input current with the threshold current; and
   a sum signal generation means configured to only transistors for outputting a differential sum signal for the input current and the threshold current according to a comparison result of the carry generation means.

2. The full adder as recited in claim 1, wherein the carry generation means and the sum signal generation means are operated by mirroring the input current.

3. The full adder as recited in claim 1, wherein the threshold current is n times of the reference current, wherein n is integer.

4. The full adder as recited in claim 1, wherein the threshold current and the reference current are adjusted by a size ration of transistors.

5. The full adder as recited in claim 1, wherein the carry generation means generates the carry when the input current is lower than the threshold current and does not generate the carry when the input current is higher than or equal to the threshold current.

6. The full adder as recited in claim 1, wherein, when the input current is lower than the threshold current, the sum signal is only outputted, when the input current is equal to the threshold current, the carry is only outputted and, when the input current is higher than the threshold current, the carry and the sum signal are outputted at the same time.

7. The full adder as recited in claim 1, wherein the reference current generation means includes:
   diode-coupled first transistor of a first conductive type and second transistor of a second conductive type coupled in series between a first voltage and a second voltage; and
   a third transistor of the first conductive type, whose gate is commonly coupled to a gate of the first transistor and source is coupled to the first voltage, outputting the reference current.

8. The full adder as recited in claim 7, wherein the carry generation means includes:
   a fourth transistor of the first conductive type, whose gate is coupled to the first voltage and gate is commonly coupled to gates of the first and the third transistors, outputting the threshold current from its drain;
   a fifth transistor of a second conductive type, whose drain receives the input current and drain and gate are coupled each other;
   a sixth transistor, whose drain receives the input current, forming a current mirror with the fifth transistor;
   an inverter, which is coupled to a drain of the sixth transistor, outputting a first logic value when the input current is lower than the threshold current and outputting a second logic value when the input current is higher than or equal to the threshold voltage; and
   a seventh transistor of the second conductive type, whose drain is coupled to a drain of the third transistor and gate receives an output of the inverter, outputting the carry when the output of the inverter is the second logic value.

9. The full adder as recited in claim 8, wherein sum signal generation means includes:
   a eighth transistor of the first conductive type forming a current mirror with the third transistor;
   a ninth transistor of the second conductive type, whose gate receives the output of the inverter, coupled with the eighth transistor in series;
   a tenth transistor of the second conductive type forming a current mirror with the fifth transistor and coupled between the ninth transistor and the second voltage;
   a diode-coupled eleventh transistor of the second conductive type, which is coupled to a node between the tenth transistor and the ninth transistor, supplying a differential current of the threshold current and the input current according to turn-on or turn-off of the ninth transistor;
   a diode-coupled twelfth transistor of the first conductive type coupled between the first voltage and the ninth transistor; and
   a thirteenth transistor of the first conductive type, which forms a current mirror with the twelfth transistor, outputting the sum signal, which is a differential current of the input current and the threshold current.

10. The full adder as recited in claim 9, wherein the fifth, sixth and tenth transistors are fabricated with the same size.

11. The full adder as recited in claim 9, wherein the fourth and eighth transistors are fabricated with the same size.

* * * * *